Sept. 3, 1929.  T. E. MURRAY ET AL  1,726,914
MOUNTING FOR SWITCHES AND OTHER ELECTRICAL APPARATUS
Filed Sept. 21, 1920    2 Sheets-Sheet 2
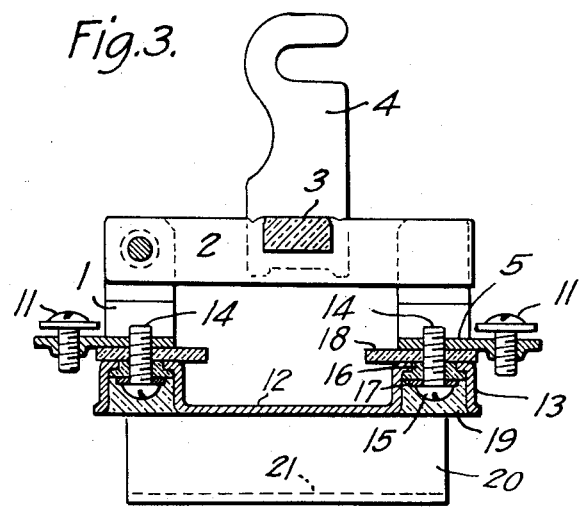
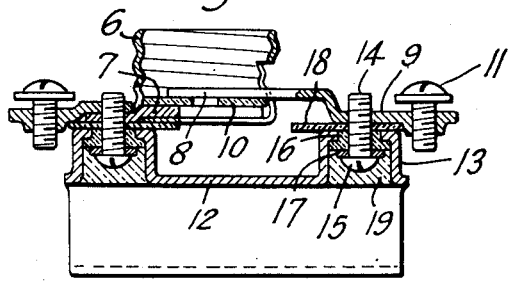
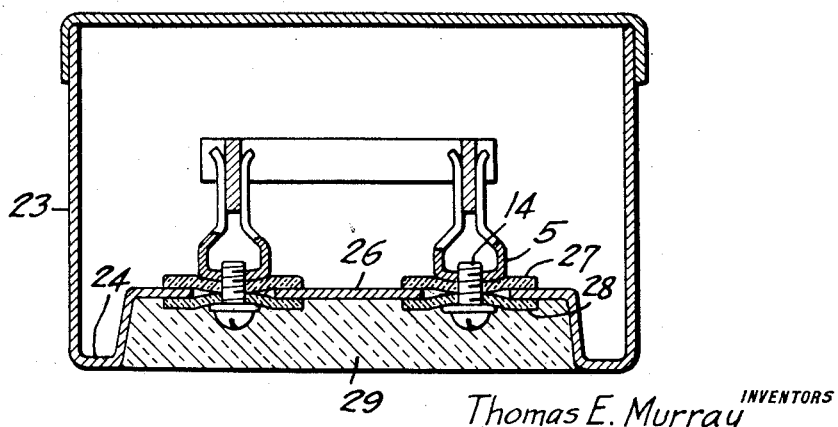
INVENTORS
Thomas E. Murray
Thomas E. Murray, Jr.
BY
ATTORNEY Patented Sept. 3, 1929.

REISSUED 1,726,914

UNITED STATES PATENT OFFICE.

THOMAS E. MURRAY AND THOMAS E. MURRAY, JR., OF BROOKLYN, NEW YORK.

MOUNTING FOR SWITCHES AND OTHER ELECTRICAL APPARATUS.

Application filed September 21, 1920. Serial No. 411,824.

Our invention aims to provide certain improvements especially in the direction of economy, accuracy and reliability in this class of devices.

The accompanying drawings illustrate embodiments of our invention.

Figure 1:
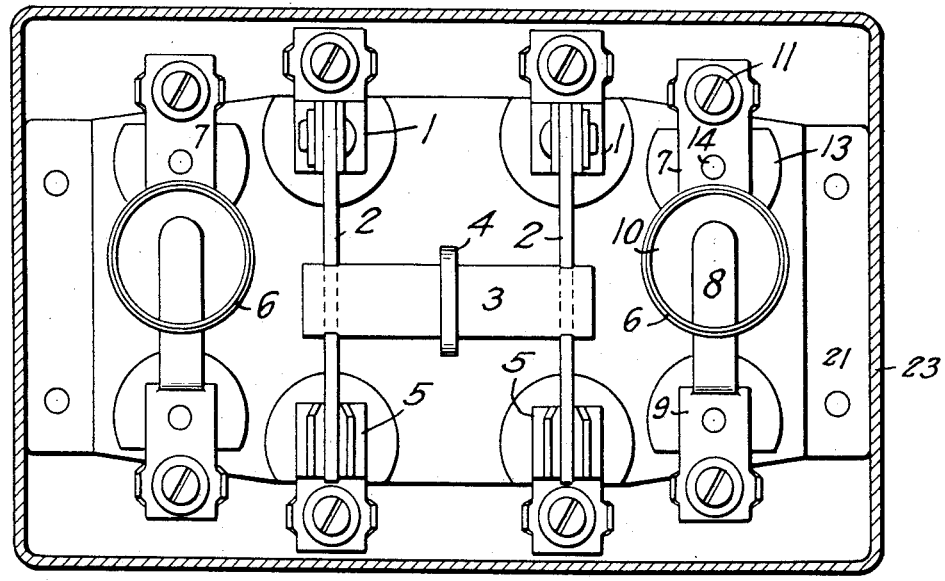
Fig. 1 is a plan of a two-bladed switch with fuse connections all enclosed in a box.
Figure 2:
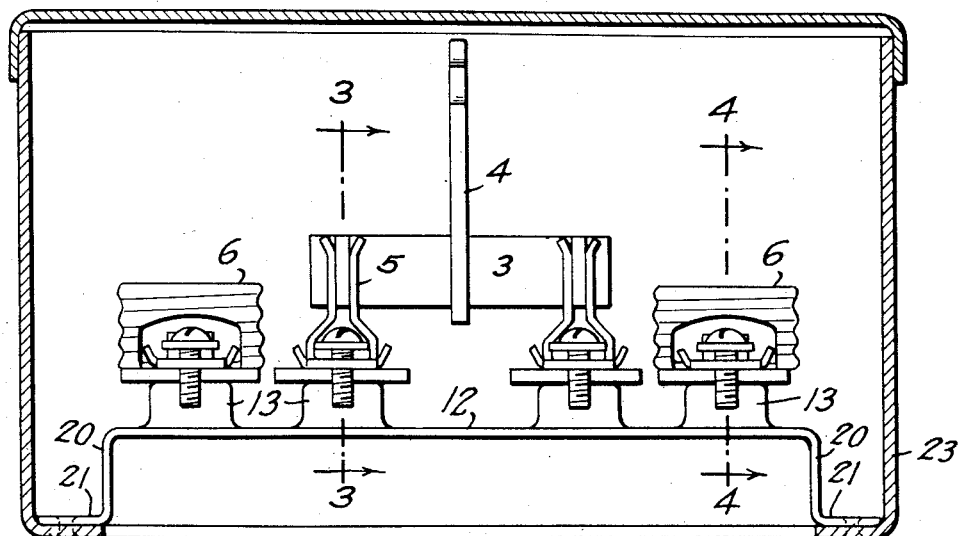
Fig. 2 is a longitudinal section of the box, the usual cover being omitted, the electrical devices being in elevation.

Figs. 3 and 4 are transverse sections of the electrical apparatus on the lines 3—3 and 4—4 of Fig. 2;

Fig. 5 is a section similar to Fig. 2 illustrating a modified construction.

In electrical apparatus of this class and particularly electric switches carries in metal boxes it is customary to mount the several electrically separate parts of the apparatus on a common block of porcelain or similar insulating material which is mounted within the steel box. Such porcelain blocks are comparatively expensive and subject to comparatively easy breakage. It is difficult also to mold such blocks with accuracy.

We purpose to avoid these disadvantages by using a metal holder, which is directly a part of the box itself, and to fasten the electrically separated parts of the apparatus to such holder and to insulate them separately therefrom. Such boxes may be made cheaply and accurately of drawn or pressed steel or other metal which is not liable to break in transportation or use.

Referring first to Figs. 1 to 4, there are two posts 1 each carrying a pivoted end of one of the blades 2 which are operated by an insulated cross-bar 3 and arm 4. Opposite the posts 1 are posts 5 each composed of two leaves between which the free ends of the blades fit when the switch is closed, and from which the blades are withdrawn when the switch is open. For receiving the usual fuses there are two sockets 6 each mounted on a small plate or flange 7 and in each socket there is a contact tongue 8, the outer end of which constitutes a plate or flange 9; the plates 7 and 8 serving to fasten these parts to their support. The tongues 8 are insulated from the sockets by means of mica plates 10 (Fig. 4).

Each of the parts 1, 5, 7 and 9 above described is provided with a binding screw 11 for attachment of a wire; the wires passing out through the walls of the box in any usual or suitable way, not illustrated.

The several fixed parts described are mounted on a holder comprising a plate 12 which is a raised portion of the box or enclosure in which the electrical devices are carried. This plate is formed with hollow upward projections 13, one corresponding to each of the posts or fixed supporting parts of the electrical apparatus, and each of such parts is fastened separately on the corresponding projection 13. A screw 14 passes through an enlarged opening in the end of the projection, its head 15 going easily within the hollow thereof, and engages the supporting post or plate of the electrical apparatus, as 5 or 9 in Figs. 3 and 4. The central part of the screw is surrounded by an insulating bushing 16, and a washer 17 of mica or other insulating material further separates the screw head from the steel holder. A washer 18 is interposed between the fixed part of the electrical apparatus and the metal holder, and is preferably made large enough to extend beyond the sides of the projection 13 so as to ensure against accidental connection between the electrical apparatus and the projection on the metal holder. For further holding the screw and insulating its head the projection 13 is filled with a body 19 of plastic insulating material so as to embed the parts of the screw therein.

According to Fig. 2 the plate or holder 12 is elevated above the bottom and is bent at its ends to form spacing portions 20 which are bent up from the bottom 22 of the steel box, the sides of which are indicated at 23.

By this construction the separate parts of the electrical apparatus are firmly and accurately mounted in exact relation with each other and are abundantly protected from short circuiting by moisture or other accidental connection, and the construction is considerably cheaper as well as better than that heretofore employed for similar apparatus.

Fig. 5 illustrates several modifications in detail. The bottom of the box is bent up to form a plate 26 to which the posts of the apparatus are fastened. The screws 14 are arranged to clamp the two mica washers 27 and 28 together, or nearly so, the opening through the holder being made sufficiently large to permit this and the bottom of the posts being convexed slightly to assist in securing this result. This detail of insulation may be applied equally to the construction of Figs. 1 to 4. A separate shaped insulating bushing is thus unnecessary. Instead of having a separate projection on the holder for each of the posts the holder itself (Fig. 5) constitutes a single projection, the space within which is filled, after the fastenings are applied, by a body 29 of insulating cement. The holder or the box may be enameled or otherwise treated to prevent rusting, or it may be without such enameling. The fastening screws referred to may equally well be rivets and may be square or round or of other suitable cross-section, and the holes through which they pass may also be of various shapes.

The bottom of the box in Fig. 2 may be open below the holder 12 as shown to save metal and to give access to the underside of the holder, or it may be closed solidly. And in either case the space within the holder may be filled with insulating cement.

Though we have described with great particularity of detail certain embodiments of our invention, yet it is not to be understood therefrom that the invention is restricted to the particular embodiments illustrated. Various modifications thereof in detail and in the arrangement of the parts may be made by those skilled in the art without departure from our invention as defined in the following claims.

What we claim is—

1. The combination with an electric cut-out of a metal enclosure therefor having a raised portion of a wall thereof constituting a base on which the opposite terminal members of the cut-out are mounted with insulating washers for separating said terminals from the base and from each other.

2. The combination with an electric cut-out of a metal enclosure therefor having a raised portion of a wall thereof constituting a base on which the opposite terminal members of the cut-out are mounted with separate insulating washers for each of said terminals for separating it from the other terminal and from the base.

In witness whereof, we have hereunto signed our names.

THOMAS E. MURRAY.
THOMAS E. MURRAY, Jr.